(12) United States Patent  (10) Patent No.: US 9,385,808 B2
Lee  (45) Date of Patent: Jul. 5, 2016

(54) FLICKER-FREE COLOR VISIBLE LIGHT COMMUNICATION SYSTEM

(71) Applicant: Moon Key Lee, Seoul (KR)

(72) Inventor: Moon Key Lee, Seoul (KR)

( * ) Notice: Subject to any disclaimer, the term of this patent is extended or adjusted under 35 U.S.C. 154(b) by 0 days.

(21) Appl. No.: 14/369,534

(22) PCT Filed: Dec. 31, 2012

(86) PCT No.: PCT/KR2012/011871
§ 371 (c)(1),
(2) Date: Jun. 27, 2014

(87) PCT Pub. No.: WO2013/100743
PCT Pub. Date: Jul. 4, 2013

(65) Prior Publication Data
US 2015/0003837 A1    Jan. 1, 2015

(30) Foreign Application Priority Data

Dec. 31, 2011 (KR) .................. 10-2011-0148013
Jan. 27, 2012 (KR) .................. 10-2012-0008126
Dec. 2, 2012 (KR) .................. 10-2012-0138640

(51) Int. Cl.
    *H04B 10/116*    (2013.01)
    *H04N 9/31*    (2006.01)
(52) U.S. Cl.
    CPC ............. *H04B 10/116* (2013.01); *H04N 9/312* (2013.01); *H04N 9/3111* (2013.01)
(58) Field of Classification Search
    USPC .......................... 398/130, 140, 141, 172, 183
    See application file for complete search history.

(56) References Cited

U.S. PATENT DOCUMENTS

| 2007/0058987 | A1 | 3/2007 | Suzuki |
| 2008/0063410 | A1 | 3/2008 | Irie |
| 2009/0214225 | A1 | 8/2009 | Nakagawa et al. |
| 2009/0310971 | A1 | 12/2009 | Kim et al. |
| 2009/0310976 | A1 | 12/2009 | Nakagawa et al. |
| 2010/0111538 | A1 | 5/2010 | Arita et al. |
| 2010/0135673 | A1* | 6/2010 | Son ............... H04B 10/1141 398/183 |
| 2011/0064405 | A1* | 3/2011 | Rajagopal ........ H04B 10/114 398/43 |

FOREIGN PATENT DOCUMENTS

| CN | 1723639 A | 1/2006 |
| CN | 1933369 A | 3/2007 |
| CN | 101023607 A | 8/2007 |
| CN | 101432997 A | 5/2009 |
| JP | 2001-189660 A | 7/2001 |
| JP | 2006-325085 A2 | 11/2006 |
| JP | 2007-013485 A | 1/2007 |
| JP | 2007-019935 A | 1/2007 |

(Continued)

OTHER PUBLICATIONS

International Search Report, International Application No. PCT/KR2012/011871 mailed Apr. 23, 2013.

*Primary Examiner* — David Payne
*Assistant Examiner* — Omar S Ismail
(74) *Attorney, Agent, or Firm* — Leydig, Voit & Mayer, Ltd.

(57) ABSTRACT

The present invention relates to the color communication system so that human eye does not sense flicker. Communication using 3 primary color light pulses is faster than the communication system using only one white color pulse. Illumination light source or color display can be used for such color communication system.

19 Claims, 3 Drawing Sheets

(56) References Cited

FOREIGN PATENT DOCUMENTS

| JP | 2007-081703 | A2 | 3/2007 |
| JP | 2011-061305 | A2 | 3/2011 |
| KR | 10-2008-0026111 | A | 3/2008 |
| KR | 10-2010-0014737 | A | 2/2010 |
| KR | 10-2010-0059737 | A | 6/2010 |
| KR | 10-2011-0093802 | A | 8/2011 |
| KR | 10-2012-0054740 | A | 5/2012 |

* cited by examiner

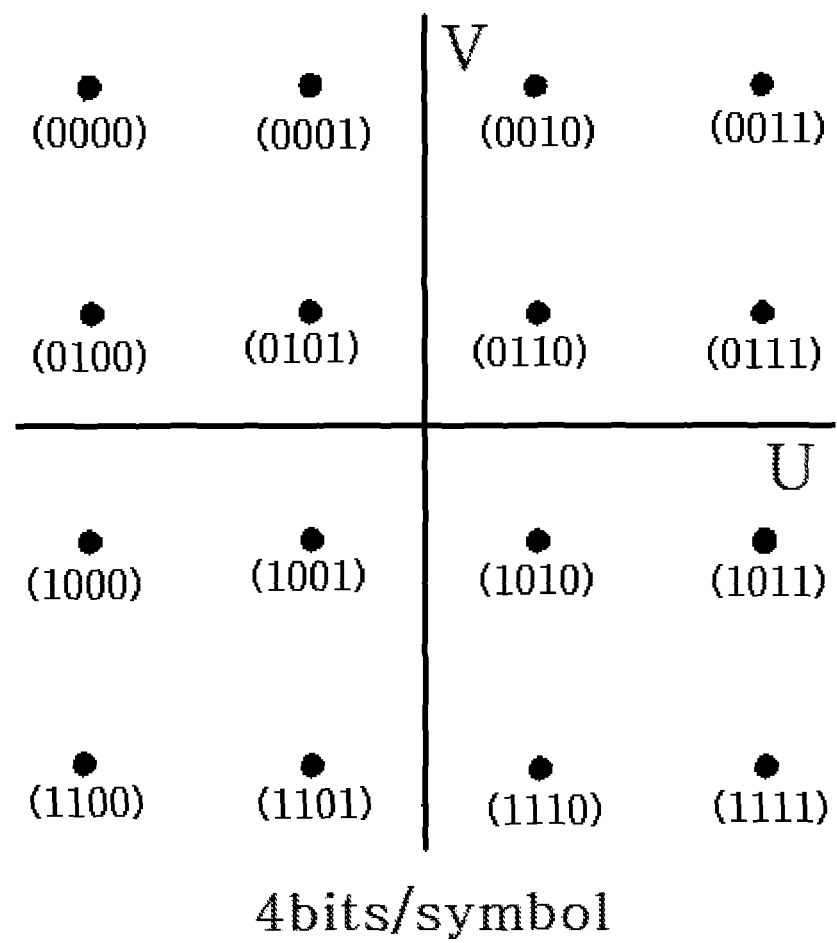

FLICKER-FREE COLOR VISIBLE LIGHT COMMUNICATION SYSTEM

TECHNICAL FIELD

The present invention relates to a technology of removing a flicker from color visible light communication.

BACKGROUND ART

The present invention relates to visible light communication which transmits information by modulating light and receiving information by detecting the modulation of light. The color visible light communication system using a light source of several colors is suggested in order to increase the communication speed.

In document D1 (Korean Patent Application Number 10-2009-7020581, VISIBLE LIGHT TRANSMITTER, VISIBLE LIGHT RECEIVER, VISIBLE LIGHT COMMUNICATION SYSTEM, VISIBLE LIGHT COMMUNICATION METHOD), the technology which uses color modulation for high speed communication is disclosed.

In document D2 (Korean Patent Application Number 10-2010-0116002, Apparatus and Method and method that do send-receive using chrominance information in visible light communication system), the technology which uses color modulation instead of brightness modulation in order to remove the flicker of light is disclosed.

DETAILED DESCRIPTION OF THE INVENTION

Technical Problem

The present invention relates to a technology of removing a flicker from color visible light communication as the above Doc1 and Doc2 and the present invention can be classified into two categories:

The first category is the color communication using illumination light and the second category is the color communication using a color display like an LCD, an OLED, and a beam projector.

Technical Solution

In order to achieve the above objective, a color communication system according to the present invention transmits the colors by modulating three primary colors (red, blue, and green) each in a predetermined pattern during a very short time interval (this is referred to as a period in the present invention), wherein the total summation of the three colors that are transmitted during the short period maintains to be a white color of a constant brightness. It is recommended to make the period sufficiently short (it is recommend to select the period to be shorter than 0.01 second because the human eye cannot detect the flicker whose frequency is larger than 100 Hz) so that the flicker of the three primary colors cannot be detected by the human eye, being sensed as if the colors are simultaneously and continuously radiated. Such light colors modulated with a high frequency are sensed as white to the human eye but a high speed color sensor can detect the color modulation and receive information by recognizing the pattern of the color modulation. According to the present invention, the human eye cannot sense the flicker of the color communication system because the color communication system transmits color light in a modulation pattern during a period, while constantly maintaining the total light transmitted during the period to be white by limiting the modulation pattern, so that the human eye can always sense the white color of the constant brightness. This is contrary to above patent documents D1 and D2, in which the human eye can sense the flicker of each different color light transmitted by the communication system, because the communication system just transmits different colors at each period. By using the color communication system of the present invention, it is possible to provide flicker free illumination and high speed communication system at the same time.

Advantageous Effects

By using the color communication system of the present invention, it is possible to perform high speed communication with flicker free illumination.

DESCRIPTION OF THE DRAWINGS

FIG. 5 illustrates 16 lattice points in color UV plane.

BEST MODE

Embodiment 1

Figure 1:
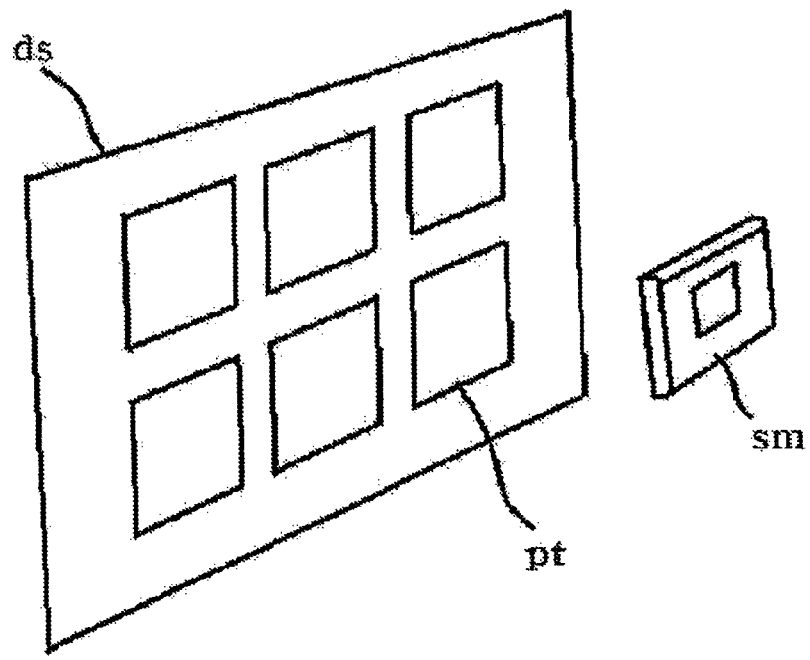
FIG. 1 illustrates a second embodiment of the present invention.

A visible light illumination communication system is a system which transmits information by switching on and off the illumination light source and receives information by detecting the light pulse by photo sensor. An LED can be used as a light source for such a communication system. Also, in addition to the LED of an illumination device, an LED used as a backlight of an LCD can transmit information by switching on and off the illumination light at high frequency. Manchester coding can be used as the method for switching on and off the light source.

By dividing a predetermined short time interval into 2 sub intervals and switching on during only the 2nd sub interval, bit 0 can be transmitted by the Manchester coding. (Such a short time interval is called period in the present invention. It is recommend to set the period to be shorter than 0.01 second because the human eye cannot detect the flicker whose frequency is larger than 100 Hz.)

Similarly, by dividing the predetermined short time interval into 2 sub intervals and switching on during only the 1st sub time interval, bit 1 can be transmitted by the Manchester coding. Such an outputting method can be represented by the following table

TABLE 1

| Output bit | Photo coding matrix |
|---|---|
| 0 | (0, 1) |
| 1 | (1, 0) |

The 2nd column of table 1 represents the 1×2 matrix (w1, w2). Such a matrix is called a photo coding matrix in the present invention. The matrix elements w1, and w2 of the photo coding matrix (w1, w2) are defined as the brightness of light emitted during the 1st and 2nd sub time intervals, respectively, of the given period. If the value is 0 then no light is emitted and if the value is 1 then light of maximum brightness is emitted. If the value is real value between 0 and 1 (for example, 0.5) then light of half brightness is emitted. Such modulation of white light is considered as the special case of modulation of 3 primary colors. In other words, switching on and off the white light is equivalent to switching on and off the red, green and blue light simultaneously and this can be represented as the following 3×2 photo coding matrix.

$$\begin{pmatrix} R_1 & R_2 \\ G_1 & G_2 \\ B_1 & B_2 \end{pmatrix}$$ [Equation 1]

The 1st, 2nd, and 3rd row of the above matrix represent the brightness of red, green, and blue light respectively. And the 1st and 2nd column represent the brightness of light emitted during the 1st and 2nd sub time intervals respectively of the given period. By modulating the 3 primary color light sources in the Manchester coding with the same clock signal (i.e., by using the 3 primary colors as independent 3 communication channels), the communication speed can be three times faster than the case using the only one white light source. Such a communication system using colors encoded by the Manchester coding can be used as an illumination system because the Manchester coding divides a period into 2 sub time intervals and the color pulse must be emitted in one of the sub time intervals so that the human eye can see the white color. However, a high speed photo sensor can determine whether the color pulse is detected in the 1st sub time interval or in the 2nd sub time interval. Dividing the period into 2 sub time intervals can be generalized as dividing the period into n sub time intervals where n is a natural number greater than 2. In this case, the photo coding matrix can be a 3×n matrix as following:

$$\begin{pmatrix} R_1 & R_2 & R_3 & \ldots & R_n \\ G_1 & G_2 & G_3 & \ldots & G_n \\ B_1 & B_2 & B_3 & \ldots & B_n \end{pmatrix}$$ [Equation 2]

For example, when n=3, $$\begin{pmatrix} 1 & 0 & 0 \\ 0 & 0.5 & 0.5 \\ 0.5 & 0.5 & 0 \end{pmatrix}$$ [Equation 3]

The above photo coding matrix of n=3 represents the following color modulation:

Emitting red of maximum brightness during only the 1st sub time interval

Emitting green of half brightness during only the 2nd and 3rd sub time intervals Emitting blue of half brightness during only the 1st and 2nd sub time intervals The red light is emitted during only one sub time interval, though it is emitted by the maximum brightness, and the green and blue lights are emitted during two time intervals, though they are emitted by the half brightness, and thus, the total summation of the light emitted during the period is white. This can be represented as following:

$$\sum_{i=1}^{n} R_i = 1$$
$$\sum_{i=1}^{n} G_i = 1$$
$$\sum_{i=1}^{n} B_i = 1$$ [Equation 4]

The color communication system of the present invention transmits information by dividing the period into n sub time intervals (in this case, it is recommended to make lengths of all the sub time intervals equal in order to make the system simple.), and encoding information by modulating the 3 primary color light sources according to the 3×n photo coding matrix. Here, the period is set to be short enough and the modulation pattern is restricted such that the summation of matrix elements of rows of the 3×n photo coding matrix is 1 so that the human eye cannot sense a flicker but sense only the constant white color.

A receiving part of the communication system of the present invention recovers the clock signal from the detected color pulse by using given information of a length of the period and the number of sub intervals, detects a starting point of each period, and detects the brightness of the color pulse during each sub-time interval of each period, so as to recognize the modulation pattern to obtain the photo coding matrix, and decodes information from the matrix. In order to recover the clock signal by the receiving part, it is recommended for a sending part of the communication system of the present invention to use block coding (for example, 4b/5b coding). Also, in order to detect the starting point of each period, it is recommended to add sync word or preamble, which are predefined and shared by the transmitting part and the receiving part, at the head of data frame.

The communication system of patent documents D1 and D2 can be considered as a special case of the communication system of the present invention with a 3×1 photo coding matrix, and in the communication system of patent documents 1 and 2, the color of each period is not guaranteed to be the constant white color and the human eye can sense a flicker (in other words, such a system can be a communication system but is not suitable for an illumination system).

The color communication system of the present invention can be both flicker free illumination and a communication system.

Above math equation 4 can be generalized as following:

$$\sum_{i=1}^{n} R_i = C_1$$
$$\sum_{i=1}^{n} G_i = C_2$$
$$\sum_{i=1}^{n} B_i = C_3$$ [Equation 5]

It means that the summation of the amount of color light emitted during each period can be some constant color (R=C1, G=C2, and B=C3) which is not white(R=G=B=1)

color, where C1,C2, and C3 is real value between 0 and 1. If C1=C2=C3=1 then the human eye senses the color as white. But if the values of C1, C2, and C3 are identical and constant then human eye can sense a constant color which is flicker free. For example, if C1=0.9, C2=0.7, and C3=0.7 then human eye can sense a reddish white color.

If a distance between the transmitting part and the receiving part of the communication system of the present invention changes then the amount of light received by the receiving part changes but a ratio of the amount of the primary color light (i.e., red, blue, and green lights) does not change. Therefore it is recommended to receive information by detecting the ratio of colors rather than detecting the absolute amount of colors.

Embodiment 2

The communication system transmitting information by switching on and off the white LED which is the backlight of the LCD and receiving information by detecting the modulated light is known and can be found in Samsung electronics software membership web site http://www.secmem.org/exhibition/ssm2011ex/w/view-Projectasp?p_num=40 with the title "visible light communication based smart display." The present embodiment relates to a communication system that transmits information by modulating colors of a color display like the LCD, an OLED or a beam projector rather than by modulating the white light as in the above communication system, and receives the information by detecting the color change via a color sensor. In the communication system of the present embodiment, such a color change does not degrade the quality of an image displayed on a screen and does not produce a flicker.

By dividing a period (a short time interval) into n sub time intervals, as in the case of embodiment 1, outputting a color modulated picture frame (it is called a sub picture frame in the present invention) for each sub time interval, and detecting the color change by a high speed color sensor, it is possible that the human eye does not sense the flicker but sense an ordinary color picture. In other words, by making the period be sufficiently short, the human eye just senses an averaged picture frame which is the overlap of each sub picture frame of the sub intervals. Such a modulated sub picture frame for each sub time interval can be produced by multiplying the matrix element of the photo coding matrix of embodiment 1 by each pixel value of 3 primary color components of the original picture.

For example, if the photo coding matrix of equation 3 of embodiment 1 is given then the sub frames can be produced in the following steps:

1. divide a period into 3 sub time intervals where 3 is the column number of the matrix of equation 3.

2. multiply the 1st column (1, 0, 0.5) of the photo coding matrix of math equation 3 by RGB color components of the original picture frame, respectively, to make a sub frame to be outputted during the 1st sub time interval. (in other words, the sub frame picture has the pixel values (R*1, G*0, B*0.5) where (R,G,B) is the pixel value of the original picture.) (* means multiplication)

4. multiply the 2nd column (0, 0.5, 0.5) of the photo coding matrix of math equation 3 by RGB color components of the original picture frame, respectively, to make a sub frame to be outputted during the 2nd sub time interval. (in other words, the sub frame picture has the pixel values (R*0, G*0.5, B*0.5).)

5. multiply the 3rd column (0, 0.5, 0) of the photo coding matrix of math equation 3 by RGB color components of the original picture frame, respectively, to make a sub frame to be outputted during the 3rd sub time interval. (in other words, the sub frame picture has the pixel values (R*0, G*0.5, B*0).)

The 3 sub frame pictures displayed during the sub time intervals can be overlapped and averaged to be seen as one original color picture for the human eye but the high speed color sensor can detect the color change so that it is possible to receive information indicated by the color change. The change of the color of an original motion picture is not constant nor predictable, and thus, it is difficult to send information by a ratio of the amount of the primary color light (i.e., red, blue, and green lights), as in embodiment 1. Therefore, it is recommended to restrict the photo coding matrix elements to be 0 or 1. By doing so, the receiving part can decode information by checking simply whether each primary color is detected or not. In other words, the receiving part does not have to measure an absolute value of the color light brightness.

If the original picture frame is black then its sub frame pictures are also black, and thus, the information cannot be encoded by a color change. Therefore, it is recommended to alter the brightness of the original black picture frame to gray.

By displaying the sub frames produced by the photo coding matrix for each sub time interval, while adding the constraint condition of math equation 4 to the photo coding matrix, the human eye can sense the original color picture. The brightness of the original picture may be increased before producing the sub frames (or the brightness of a display device may be increased), because each of the sub frames is displayed only for each corresponding sub time interval, which leads to a degradation of the general brightness. Although the absolute brightness of the display can be decreased, the ratio of primary colors of the outputted picture does not change, and thus, there is no image quality degradation or a change of a color.

When the photo coding matrix of the case in which the period is divided into n sub time intervals, as in math equation 2, is given, an $i^{th}$ sub frame picture can be obtained as follows (where i is a natural number from 1 to n.):

multiply RGB color components of each pixel of an original picture by the $i^{th}$ column (Ri, Gi, and Bi, respectively) of the photo coding matrix of math equation 2

This can be represented as following equations:

a red component value of a pixel whose coordinate is $(x,y)$ in the $i^{th}$ sub frame picture=(a red component value of a pixel whose coordinate is $(x,y)$ in the original picture)*$Ri$ a green component value of the pixel whose coordinate is $(x,y)$ in the $i^{th}$ sub frame picture=(a green component value of the pixel whose coordinate is $(x,y)$ in the original picture)*$Gi$ a blue component value of the pixel whose coordinate is $(x,y)$ in the $i^{th}$ sub frame picture=(a blue component value of the pixel whose coordinate is $(x,y)$ in the original picture)*$Bi$ Such sub frame pictures can be produced in real time together with playing of a motion picture, by including a dedicated circuit in a display device, or the sub frame pictures can be produced by software by using each frame picture of a motion picture file and after that, a new motion picture file may be formed of newly generated sub frame pictures instead of each frame picture and played via an ordinary high speed display device.

The human eye senses the displayed sub frames pictures modulated by the photo coding matrix of math equation 3 as more reddish than the original color because of a nonlinear property of the display. Therefore, it is recommended to modulate the sub frames with the gamma corrected photo coding matrix to prevent the quality degradation. For example, if the display has a gamma value=2.2 then it is recommended to substitute the matrix elements of equation3 with $$(\text{matrix element})^{\frac{1}{2.2}}$$

1/2.2 powered 0.5 is 0.72. It means that the brightness of green and blue is increased. It is also recommended to gamma correct the photo coding matrix for embodiment 1 in consideration of a nonlinear property of the light source.

It is possible to divide the display region into sub regions (for example, a plurality of small rectangles) where each sub region can be used as a different communication channel. For example, it is possible to simultaneously display many photographs of a product in a matrix form, and with respect to each photograph, its product id or url may be transmitted to the color visible light communication according to the present embodiment.

By doing this, it is possible to remove an QR code which occupies some region of the display screen. User can obtain information of a product of his interest by receiving the color pulse from the display with the receiver of the present embodiment. FIG. 1 shows color communication between a sub region (pt) of the plurality of product photographs displayed on the display (ds) and a photo sensor or a high speed camera of a smart phone (sm).

Application Embodiment 1

A high speed image sensor can be used as the receiver in addition to photo sensor such as a photo transistor. In this case, it is possible to synthesize information received by the color visible light communication according to the present invention onto an image captured by an image sensor like augmented reality.

Application Embodiment 2

Table 2 is an example showing bit values 0 and 1 in the 3×2 photo coding matrix as in equation 1.

TABLE 2

| Bit | 3 × 2 photo coding matrix |
|---|---|
| 0 | $\begin{pmatrix} 1 & 0 \\ 0.5 & 0.5 \\ 0 & 1 \end{pmatrix}$ |
| 1 | $\begin{pmatrix} 1 & 0 \\ 0.5 & 0.5 \\ 1 & 0 \end{pmatrix}$ |

Figure 2:
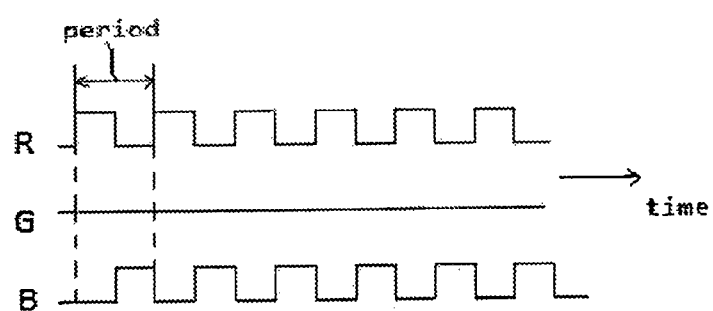
FIG. 2 is a graph illustrating a brightness of light radiated from three primary colors when the bit 0 of table 2 is continually transmitted during many periods.
Figure 3:
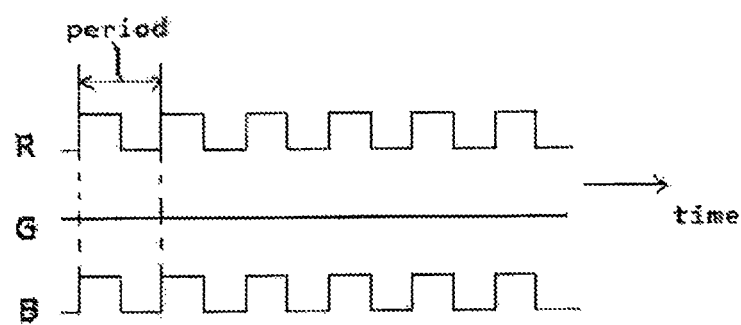
FIG. 3 is a graph of a brightness of light radiated from three primary colors when the bit 1 of table 2 is continually transmitted during many periods.

All elements of the 2nd row of the matrix of above table 2 are 0.5. This means that a green light source denoted by the second row is always switched on. Flicker can be reduced by always switching on the green light source which is the most sensitive color of the three primary colors for the human eye. The 1st row of the matrix of table 2 can be interpreted as a clock signal. It means that a red light source denoted by the first row is constantly switched on and off regardless of the encoded bit value. The receiving part of the communication system can synchronize the clock signal by detecting the switch off of the red color. Synchronizing the clock signal means recognizing a start point of the period. The 3rd row of the matrix of table 2 is a bit value. If the blue light denoted by the third row is switched on during a 1st sub time interval of the period then such a blue color pulse represents bit 1. If the blue light is switched on during a 2nd sub time interval of the period then such a blue color pulse represents bit 0. It is recommended to use the blue color to encode the bit value rather than the red color, because the blue color is darker for the human eye than the red color so that a flicker of the blue color is less visible than a flicker of the red color. The human eye can sense a white color from the color pulse of the communication system of table 2 because the sum of elements of each row of table 2 is always 1. FIG. 2 is a graph illustrating a brightness of light radiated from three primary colors when the bit 0 of table 2 is continually transmitted during many periods. FIG. 3 is a graph of a brightness of light radiated from three primary colors when the bit 1 of table 2 is continually transmitted during many periods.

The morse code can be transmitted by using the photo coding matrix of table 2 That is, information to transmit is converted into the morse code and a non zero current of morse code is assigned to bit 1 of the photo coding matrix and a zero current morse code is assigned to bit 0 of the photo coding matrix. A color light source is modulated by the photo coding matrix corresponding to the morse code. The receiving part can receive a periodic red pulse and check whether a blue pulse is detected or not at the same sub time interval in which the red pulse is detected. If the red and blue pulses are detected at the same sub time interval then such pulses represent bit 1. That is, non zero current of morse code communication corresponds to the bit 1 of the color communication of the photo coding of table 2. Long and short currents of the morse code communication correspond to the long serial of bit 1 and the short serial of bit 1, respectively. The receiving part can measure the duration time of the serial of bit 1 and recover the original morse code.

Information can be transmitted through two channels by switching on the green light source during only one sub time interval like the blue light source of table 2. That is, there may be a communication channel using the blue light source and the communication channel using the green light source. Such a photo coding matrix can be applied to the light source of embodiment 1 and the display of embodiment 2.

The following modified photo coding matrix of table 3 can be used in order to reduce the flicker of the photo coding matrix of table 2.

TABLE 3

| Bit | 3 × 2 photo coding matrix |
|---|---|
| 0 | $\begin{pmatrix} A & Z \\ 0.5 & 0.5 \\ Z & A \end{pmatrix}$ |
| 1 | $\begin{pmatrix} A & Z \\ 0.5 & 0.5 \\ A & Z \end{pmatrix}$ |

A, and Z in the above table 3 are real numbers between 0 and 1, and A is larger than Z. That is:

0<=Z<A<=1, and

A+Z=1

Figure 4:
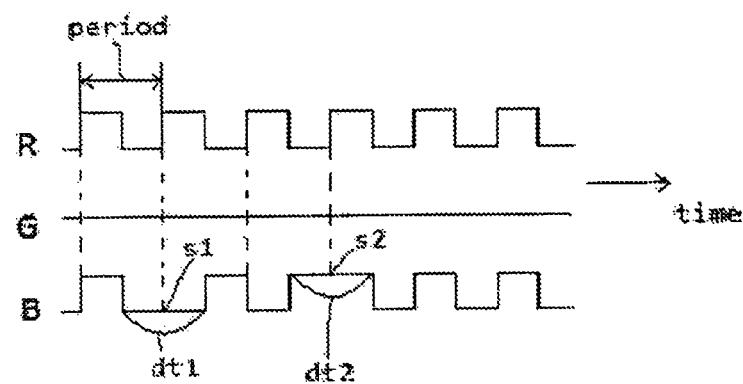
FIG. 4 is a graph of a brightness of light radiated from three primary colors when blue light transmits bit 1, and then, transmits bit 0 at time s1 and bit 1 again at time s2.

A red light source of table 2 can not be used as a communication channel of bit information because it is used as a clock signal. But the clock signal and the bit information signal can be both transmitted in a red color channel if block coding like 4b/5b is performed with respect to a bit column to be transmitted and the red light source is modulated by Manchester coding. In this case, each of red, green and blue light sources can be used as the communication channel. Then an 8-nary number can be transmitted during one period. FIG. 4 is a graph showing that the blue channel transmits bit 1 at first, then bit 0 at time s1, and then again bit 1 at time s2. In a moment when the bit value changes, a time in which light is not transmitted dt1 or a time in which light is transmitted dt2 is long. And thus, a start point of the period can be determined by detecting the long time interval like dt1 or dt2 and selecting the mid point (s1,s2) of the long time interval. The color value is constant during the long time interval. The bit value changes at the mid point (s1,s2) of such a long time interval (dt1,dt2). It is recommended to use the block coding like 4b/5b in order to easily detect the start point of the period because the block coding ensures the frequent changing of the bit value within a given time interval.

Application Embodiment 3

FIG. 5 shows FIG. 8 of patent document D2, which illustrates 16 lattice points in a color plane (UV plane). Each point represents a different color. When assuming that r(i), g(i), and b(i) are primary color values of the points and cr(i), cg(i), and cb(i) are complementary color values thereof, r(i)+cr(i)=g(i)+cg(i)=b(i)+cb(i)=1.

Here, i is a natural number from 1 to 16.

The photo coding 3×2 matrix of the present invention can be constructed as below by using such colors:

$$\begin{pmatrix} r(i) & cr(i) \\ g(i) & cg(i) \\ b(i) & cb(i) \end{pmatrix}$$ [Equation 6]

The photo coding matrix of equation 6 represents number i where i is a natural number from 1 to 16. Therefore, it is possible to transmit a 16-nary number by modulating colors by the photo coding matrix of equation 6. The human eye may sense only a white color from the light of the communication system of equation 6, because the color emitted during a first sub interval of a period and the color emitted during a second sub interval of the period are complementary to each other. By increasing the lattice points by reducing gaps between the lattice points of FIG. 5, it is possible to speed up the communication speed. The photo coding matrix can be constructed by using lattice points in another color plane rather than in the UV plane.

The photo coding matrix of equation 6 can be modified as the following 3×3 matrix of equation 7.

$$\begin{pmatrix} \theta & r(i) & cr(i) \\ \theta & g(i) & cg(i) \\ \theta & b(i) & cb(i) \end{pmatrix}$$ [Equation 7]

All elements of the 1st column of the matrix of equation 7 are zero. It means that no light is transmitted during a 1st sub time interval of a period which is divided into 3 sub time intervals. The receiving part of the color communication system can synchronize the clock signal by detecting a time interval in which no light is detected. And the receiving part of the color communication system can receive information by detecting color pulse transmitted during the rest 2 sub time intervals. This can be generalized as following:

$$\begin{pmatrix} w & r(i) & cr(i) \\ w & g(i) & cg(i) \\ w & b(i) & cb(i) \end{pmatrix}$$ [Equation 8]

The matrix element w in the above matrix of equation 8 is a real number between 0 and 1. It means that the 1st column of the above matrix corresponds to a gray color, because the first column has the same brightness ratio of the three primary colors. The receiving part may receive information by recognizing a gray color detecting point as a start point of a period. In this case, the matrix elements must be adjusted so that w+r(i)+cr(i)=w+g(i)+cg(i)=w+b(i)+cb(i)=1.

Such a black or a gray color is an example of a specific pattern to detect the start point of the period. In general, any pre-defined color other than black or gray can be used as a mark for detecting the start point of the period. Also, it is possible to speed up the communication by transmitting the pre-defined mark color during intervals of many periods rather than during every period.

The invention claimed is:

1. A flicker free visible light transmitting device comprising:
    a light emitting portion for emitting light with different colors;
    a photo encoding portion for mapping a digital value to an encoding matrix;
    a light emitting control portion for generating a light emitting pattern corresponding to the encoding matrix; and
    a light emitting portion for emitting light with different colors according to the light emitting pattern,
    wherein the encoding matrix is a 3 by n matrix whose matrix elements are real numbers from 0 to 1, wherein n is a natural number greater than 2 or equal to 2,
    wherein the light emitting control portion controls the emitting light by the encoding matrix during every period, controls the emitting light of a light source of a 1st color according to a 1st row of the encoding matrix, controls the emitting light of a light source of a 2nd color according to a 2nd row of the encoding matrix, and controls the emitting light of a light source of a 3rd color according to a 3rd row of the encoding matrix.

2. A flicker free visible light receiving device comprising:
    a photo sensing portion for sensing light;
    a received light calculation portion for calculating a decoded matrix from a received light pattern; and
    a photo decoding portion for mapping the decoded matrix calculated by the received light calculation portion to digital value, wherein the decoded matrix is a 3 by n matrix whose matrix elements are real numbers from 0 to 1, wherein n is a natural number greater than 2 or equal to 2, wherein the received light calculation portion calculates a 1st row of the decoded matrix from a received light pattern of a 1st color, calculates a 2nd row of the decoded matrix from a received light pattern of a 2nd color, and calculates a 3rd row of the decoded matrix from a received light pattern of a 3rd color.

3. A flicker free visible light communication system comprising:

a transmitting portion; and a receiving portion, wherein the transmitting portion comprises:

a photo encoding portion for mapping a digital value to an encoding matrix;

a light emitting control portion for generating a light emitting pattern corresponding to the encoding matrix; and a light emitting portion for emitting light with different colors according to the light emitting pattern, wherein the receiving portion comprises:

a photo sensing portion for sensing light;

a received light calculation portion for calculating a decoded matrix from a received light pattern; and a photo decoding portion for mapping the decoded matrix calculated by the received light calculation portion to the digital value, wherein the encoding matrix and the decoded matrix are a 3 by n matrix whose matrix elements are real numbers from 0 to 1, wherein n is a natural number greater than 2 or equal to 2, wherein the light emitting control portion controls the emitting light by the encoding matrix during every period, controls the emitting light of a light source of a 1st color according to a 1st row of the encoding matrix, controls the emitting light of a light source of a 2nd color according to a 2nd row of the encoding matrix, and controls the emitting light of a light source of a 3rd color according to a 3rd row of the encoding matrix, wherein the received light calculation portion calculates a 1st row of the decoded matrix from a received light pattern of the 1st color, calculates a 2nd row of the decoded matrix from a received pattern of the 2nd color, and calculates a 3rd row of the decoded matrix from the received pattern of the 3rd color.

4. The flicker free visible light communication system of claim 3, wherein the 1st color, the 2nd color and the 3rd color are 3 primary colors.

5. The flicker free visible light communication system of claim 3, wherein sum of all elements of a row of encoding matrix is a constant value between 0 and 1, and the constant value is the same for all periods.

6. The flicker free visible light communication system of claim 3, wherein the light emitting control portion divides 1 period into n sub time intervals, wherein n is the number of columns of the encoding matrix, and controls brightness of the light during an i-th sub time interval so that the brightness of the light is proportional to an i-th column of the encoding matrix, wherein the received light calculation portion divides 1 period into n sub time intervals, wherein n is the number of columns of the encoding matrix, and produces an i-th column of the decoded matrix from the received light during the i-th sub time interval, wherein matrix elements of the i-th column of the decoded matrix are proportional to brightness of received light and i is a natural number from 1 to n.

7. The flicker free visible light communication system of claim 3, wherein the light emitting portion is an illumination light or a display.

8. The flicker free visible light communication system of claim 6, wherein the light emitting portion is a display, wherein the light emitting control portion outputs an i-th sub frame whose pixel value is a new pixel value (R*Ri,G*Gi, B*Bi) during the i-th sub time interval, and wherein (R,G,B) is the pixel value of an original frame and (Ri,Gi,Bi) is the i-th column of the encoding matrix.

9. The flicker free visible light communication system of claim 8, wherein the light emitting control portion divides a display region into sub regions and controls light emitted from each sub region, by assigning each sub region to a different communication channel, such that each sub region communicates independently and simultaneously.

10. The flicker free visible light communication system of claim 3, wherein the receiving portion includes an image capturing means and displays received information onto an image captured by the image capturing means.

11. A communication method of a flicker free visible light communication system, wherein the communication system comprises a transmitting portion having a light emitting portion and a receiving portion having a photo sensing portion, the method comprising:

photo encoding, by the transmitting portion, to map a digital value to an encoding matrix;

light emitting controlling, by the transmitting portion, for generating a light emitting pattern corresponding to the encoding matrix;

received light calculating, by the receiving portion, for calculating a decoded matrix from a received light pattern; and photo decoding, by the receiving portion, for mapping the decoded matrix to the digital value, wherein the encoding matrix and the decoded matrix are a 3 by n matrix whose matrix elements are real numbers from 0 to 1, wherein n is a natural number greater than 2 or equal to 2, wherein the transmitting portion controls the emitting light by the encoding matrix during every period, controls the emitting light of a light source of a 1st color according to a 1st row of the encoding matrix, controls the emitting light of a light source of a 2nd color according to a 2nd row of the encoding matrix, and controls the emitting light of a light source of a 3rd color according to a 3rd row of the encoding matrix, wherein the receiving portion calculates a 1st row of the decoded matrix from a received pattern of the 1st color, calculates a 2nd row of the decoded matrix from a received pattern of the 2nd color, and calculates a 3rd row of the decoded matrix from a received pattern of the 3rd color.

12. A communication method of a visible light transmitting device, wherein the visible light transmitting device comprises a light emitting portion, the method comprising:

photo encoding for mapping a digital value to an encoding matrix; and light emitting controlling for generating the color light emitting pattern corresponding to the encoding matrix, wherein the encoding matrix is a 3 by n matrix whose matrix elements are real numbers from 0 to 1, wherein n is a natural number greater than 2 or equal to 2, wherein the visible light transmitting device controls the emitting light by the encoding matrix during every period, controls the emitting light of a light source of a 1st color according to a 1st row of the encoding matrix, controls the emitting light of a light source of a 2nd color according to a 2nd row of the encoding matrix, and controls the emitting light of a light source of a 3rd color according to a 3rd row of the encoding matrix.

13. A communication method of a visible light receiving device, wherein the visible light receiving device comprises a photo sensing portion, the method comprising:
   received light calculating for calculating a decoded matrix from a received light pattern; and
   photo decoding for mapping the decoded matrix calculated during the received light calculating to a digital value,
   wherein the decoded matrix is a 3 by n matrix whose matrix elements are real numbers from 0 to 1, wherein n is a natural number greater than 2 or equal to 2,
   wherein the visible light receiving device calculates a 1st row of the decoded matrix from a received pattern of a 1st color, calculates a 2nd row of the decoded matrix from a received pattern of a 2nd color, and calculates a 3rd row of the decoded matrix from a received pattern of a 3rd color.

14. The flicker free visible light communication system of claim 6, wherein the number of columns of the encoding matrix is 2, and a color of a 1st column of the encoding matrix is a complementary color of a color of a 2nd column of the encoding matrix.

15. The flicker free visible light communication system of claim 14, wherein one of the rows of the encoding matrix is a clock signal, wherein one column of the row of the clock signal is 1 and the other column of the row of the clock signal is 0.

16. The flicker free visible light communication system of claim 14, wherein one row of the encoding matrix is a communication channel transmitting a block coded signal which includes a signal representing a start of a period and bit information.

17. The flicker free visible light communication system of claim 6, wherein one of these encoding matrices includes color which represents a start point of a period.

18. The flicker free visible light communication system of claim 6, wherein one column of the encoding matrix is a color which represents a start point of a period.

19. The flicker free visible light communication system of any one of claim 17 or claim 18, wherein the color which represents the start point of a period is gray or black.

* * * * *